April 6, 1943.    A. L. PIZZI ET AL    2,315,904
ARBOR CHUCKING DEVICE
Filed April 2, 1941
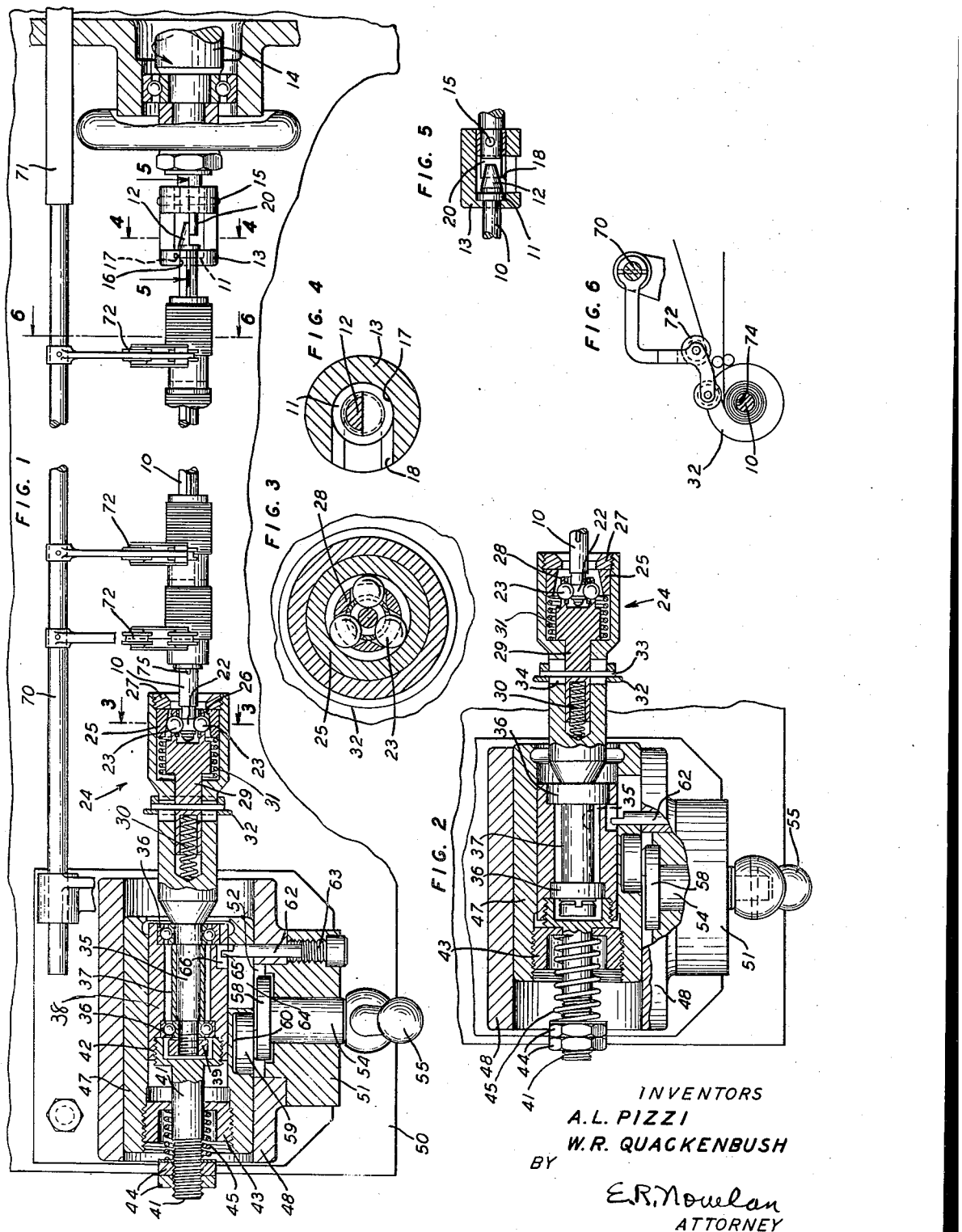
INVENTORS
A.L. PIZZI
W.R. QUACKENBUSH
BY
E.R. Nowlan
ATTORNEY Patented Apr. 6, 1943

2,315,904

UNITED STATES PATENT OFFICE 2,315,904

ARBOR CHUCKING DEVICE

Albert L. Pizzi, Newark, and Willis R. Quackenbush, Elizabeth, N. J., assignors to Western Electric Company, Incorporated, New York, N. Y., a corporation of New York Application April 2, 1941, Serial No. 386,472

12 Claims. (Cl. 242—9)

This invention relates to arbor chucking devices and more particularly to devices for chucking arbors in winding machines.

Arbors, for example, those used in machines for winding coils, vary in size, that is, in cross section and length, depending upon the inner diameter requirement and the length and number of coils to be wound thereon. When several coils are to be wound simultaneously on an arbor, the pull in the same direction of all the strands forming the coils develops a combined force tending to deflect, bend, or vibrate the arbor. Such action may cause defective winding of coils and breakage of strands.

An object of the invention is to provide a simple and highly efficient device for readily chucking arbors and holding them under tension during rotation.

With this and other objects in view, the invention comprises a ball chuck to lockingly interengage one end of an arbor, yet permit swinging movement of the arbor to position the other end thereof in a coupling, a tensioning means then being actuable to create a predetermined variable tension in the arbor to eliminate deflection or vibration thereof during the rotation of the arbor.

Other objects and advantages will be apparent from the following detailed description when taken in conjunction with the accompanying drawing wherein, Fig. 1 is a horizontal sectional view of the device, portions thereof being shown in elevation;

Fig. 2 is a fragmentary sectional view of the left-hand portion of the device shown in Fig. 1 illustrating the parts therein in a neutral position;

Fig. 3 is an enlarged fragmentary sectional view taken along the line 3—3 of Fig. 1;

Fig. 4 is an enlarged sectional view taken along the line 4—4 of Fig. 1;

Fig. 5 is a fragmentary top plan view of the coupling, this view being taken substantially along the line 5—5 of Fig. 1, and Fig. 6 is a fragmentary sectional view taken along the line 6—6 of Fig. 1.

Referring now to the drawing, attention is directed to Fig. 1, which illustrates the device shown as a part of or in combination with a machine for winding a plurality of coils on an arbor 10. The arbor 10 may be of any desired length and diameter, one end thereof being formed, as shown in Figs. 1 and 5, with an integral collar 11 and a projection 12. A coupling 13, fixed to a drive shaft 14 of the machine by suitable means, such as a removable pin 15, is notched at 16 to receive the adjacent end of the arbor 10. The coupling 13 is also recessed at 17 to receive the collar 11 of the arbor and thus form a positive connection between the arbor and the coupling. The coupling 13 is also open, as at 18, for the free movement of the projection 12 of the arbor into place, where it forms a driving connection with a reduced portion 20 of the shaft 14. The coupling 13 is of a size desirable for the arbor illustrated, but may be varied in size and contour with variations in other arbors which may be desired to be used.

The opposite end of the arbor 10 has a groove 22 therein, this groove being arcuate in cross section to receive ball members 23 of a chuck indicated generally at 24. The chuck 24 has a hollow outer end in which is disposed a ring 25, having a tapered inner surface 26, for the ball members 23 to ride upon in being forced into the groove 22 to form a positive connection between the chuck and the arbor. The ring 25 is held in the end of the chuck with and against the force of a spring 31 by a threaded member 27 apertured for the passage of the adjacent end of the arbor therethrough and for a free swinging movement of the arbor in connecting the opposite end of the arbor with the coupling 13. The ball members 23, which, in the present instance, are three in number, are disposed in a hollow annular portion 28 of a spring actuated plunger 29, a spring 30 for actuating the plunger applying a constant force thereon to move the ball members toward and in engagement with the tapered surface 26 of the ring 25. A collar 32, disposed concentric with the chuck 24 and slidably disposed thereon, carries a pin 33, which passes through elongate apertures 34 in the chuck and through the plunger 29, providing means to manually move the plunger to the left to move the ball members 23 into positions to free the arbor.

The remaining portion of the chuck is reduced in the form of a shaft 35, which is supported by bearings 36 separated by a sleeve 37 in a tubular member 38, a nut 39 disposed upon the inner threaded end 40 of the shaft portion 35 serving to hold this portion against displacement. A spring supporting rod or arm 41 is threadedly connected to the hollow member 38, as at 42, and projects to the left through an abutment 43, where its outer threaded end supports nuts 44 adjustable thereon to varying the tension of a spring 45 disposed concentric with the arm 41 and positioned between the nuts 44 and the abutments 43. The abutment 43 is threadedly disposed in a sleeve 47, which is slidably disposed in a hollow housing 48.

The housing 48 is rigidly mounted upon a suitable support, such as a base 50, and has a bearing member 51 removably secured thereto at an aperture 52, the bearing member rotatably supporting an actuating element 54. At the outer end of the actuating element, a hand lever 55 is mounted for the manual rotation of the element to cause movement of the sleeve 47. The connection between the actuating element 54 and the sleeve 47 consists of an integral annular flange 58 supporting a ball bearing 59, the center of rotation of which is eccentric with that of the element 54. The bearing 59 is disposed in a groove 60 of the sleeve 47 and is free to move therein during the actuation of the element 54. The groove 60 is not circular as may appear from the drawing but has open ends, side walls of the groove, between which the bearing 59 may travel relative to the sleeve 47, lying in parallel planes at right angles to the axis of the chuck 24. To limit the axial movement of the sleeve 47 in the housing 48 and prevent the rotation of the sleeve, a stop member 62, threadedly disposed in the cover 51, as at 63, projects through the wall of the housing and through an elongate aperture 64 in the sleeve 47. The stop 62 is also provided with a reduced end 65, which projects into an elongate recess 66 in the hollow member 38. The stop 62, therefore, limits the movement of the hollow member 38 relative to the sleeve 47, limits the movement of the sleeve in the housing, and prevents rotation of both the hollow member and the sleeve.

To further illustrate the invention, the distributing bar 70 is connected to a member 71, which is reciprocated by suitable means, not shown, for a definite distance longitudinally to cause distributing units 72 to distribute wires at spaced positions on the arbor 10 in the forming of individual coils thereon. The distributing units 72 may be of any conventional type to direct their individual wires or strands to the arbor in the forming of their coils. In starting the winding of the coils, the ends of the wires may be secured to the arbor by a key 74 receivable in an elongate groove 75 in the arbor.

In conditioning the machine for operation let it be assumed that the arbor 10 is free of any coils and is to be disposed between the chuck 24 and the coupling 13. The arbor is first connected to the chuck 24 and, in making this connection, the chuck and its associated elements are in the position shown in Fig. 2. While in this position, the plunger 29 has been moved manually to the left through the aid of the collar 32 to free the ball members 23 from the tapered surface of the ring 25, allowing free movement of the adjacent end of the arbor in place so that the ball members may be aligned with the groove 22. If desired, the arbor may be disposed in the chuck to form this connection without manually moving the plunger 29, this connection being brought about by applying sufficient force longitudinally of the arbor to move the plunger inwardly until the ball members have been moved outwardly by the arbor. The portion of the arbor between the end thereof and the groove 22 is of sufficient length to stop movement of the arbor and align the groove with the ball members, the end of the arbor abutting an inner wall of the plunger. As soon as the connection of the arbor with the chuck 24 is completed, the arbor may be swung in a direction to move the other end thereof with the collar 11 and projection 12 to form connection with the coupling 13, the projection 12 engaging the reduced portion 20 of the shaft 14 and the collar 11 entering the recess 17.

The operator may then actuate the element 54 through the aid of the handle 55 rotating the element counter-clockwise to move the bearing 59 from the position shown in Fig. 2 to the position shown in Fig. 1, causing movement of the sleeve 47 to the left and through the aid of the abutting member 43, causing compression of the spring 45. This action creates a force in the spring which is applied to the chuck 24 through the arm 41 and the hollow member 38 to cause a longitudinal force or pull on the arbor to prevent the arbor from bending or vibrating during rotation. The spring is compressed to the extent that a movement of the arbor to the right, a distance sufficient to cause complete compression of the spring would not be sufficient to cause disengagement of the collar 11 from the recess 17.

During rotation of the arbor to wind the coils thereon, it will be noted that the tension on the individual wires will create a combined force tending to deflect the arbor. If the arbor should be loosely mounted in its chuck and coupling, this force of the strands might be sufficient to deflect the arbor during its rotation or possibly cause vibration thereof resulting in irregular winding of the strands and possible breakage thereof. Such is avoided by creating a force longitudinally of the arbor which will counteract the forces transverse thereto, causing smooth and undisturbed rotation of the arbor. This longitudinal force may be varied by varying the tension on the spring 45. Such variations in the tension of the spring may be required depending upon the size of the arbor and the force applied thereto determined by the tension on the strands being wound. Furthermore, the greater the pulling force on the arbor by the spring 45, the greater will be the holding force between the chuck and the arbor, this being due to the tapered surface of the ring 25 increasing the force of the ball members 23 into the groove 22.

The embodiment of the invention herein disclosed is merely illustrative and may be widely modified and departed from in many ways without departing from the spirit and scope of the invention as pointed out in and limited solely by the appended claims.

What is claimed is:

1. A chucking device comprising spaced rotatable units to respectively hold opposite ends of an arbor, means to rotate one of the units to cause rotation of the arbor, a spring associated with one of the units and actuable to apply a pulling force longitudinally of the arbor to hold the arbor against deflection when rotating, and a member movable to actuate the spring.

2. A chucking device comprising spaced rotatable units to respectively hold opposite ends of an arbor, means to rotate one of the units to cause rotation of the arbor, a spring associated with one of the units and actuable to apply a pulling force longitudinally of the arbor to hold the arbor against deflection when rotating, and a member movable in one direction to cause actuation of the spring to apply the pulling force and movable in another direction to remove the said force from the arbor.

3. A chucking device comprising spaced rotatable units to respectively hold opposite ends of an arbor, means to rotate one of the units to cause rotation of the arbor, a spring associated with one of the units and actuable to apply a pulling force longitudinally of the arbor to hold the arbor against deflection when rotating, a member movable in one direction to cause actuation of the spring to apply the pulling force and movable in another direction to remove the said force from the arbor, and means to limit movement of the said unit.

4. A chucking device comprising spaced rotatable units to respectively hold opposite ends of an arbor, means to rotate one of the units to cause rotation of the arbor, a spring associated with one of the units and actuable to apply a pulling force longitudinally of the arbor to hold the arbor against deflection when rotating, a member movable to actuate the spring, and means to move the member.

5. A chucking device comprising spaced rotatable units to respectively hold opposite ends of an arbor, means to rotate one of the units to cause rotation of the arbor, a spring associated with one of the units and actuable to apply a pulling force longitudinally of the arbor to hold the arbor against deflection when rotating, a member movable to actuate the spring, and means to move the member into a spring actuated position and hold the member in said position.

6. A chucking device comprising spaced rotatable units to respectively hold opposite ends of an arbor, means to rotate one of the units to cause rotation of the arbor, a spring associated with one of the units and actuable to apply a pulling force longitudinally of the arbor to hold the arbor against deflection when rotating, and variable means to affect the spring to vary the said force of the spring when actuated.

7. A chucking device comprising spaced rotatable units effective to respectively hold opposite ends of an arbor, means to rotate one of the units to cause rotation of the arbor, and force applying means actuable in one direction to enhance the holding effect of the units and apply a pulling force longitudinally of the arbor to hold the arbor against deflection when rotating.

8. A chucking device comprising spaced rotatable units effective to respectively hold opposite ends of an arbor, means to rotate one of the units to cause rotation of the arbor, and force applying means actuable in one direction to enhance the holding effect of the units and apply a pulling force longitudinally of the arbor to hold the arbor against deflection when rotating, and actuable in another direction to remove the said force to facilitate connection and disconnection of the arbor with the units.

9. A chucking device comprising spaced rotatable units effective to respectively hold opposite ends of an arbor, means to rotate one of the units to cause rotation of the arbor, a spring associated with one of the units, and means to compress the spring to cause the spring, through its associated unit, to apply a pulling force longitudinally of the arbor to hold the arbor against deflection when rotating.

10. A chucking device comprising spaced rotatable units effective to respectively hold opposite ends of an arbor, means to rotate one of the units to cause rotation of the arbor, a spring associated with one of the units, and means, actuable in one direction to compress the spring to cause the spring, through its associated unit, to apply a pulling force longitudinally of the arbor to hold the arbor against deflection when rotating, and actuable in another direction to release the spring to remove the said force.

11. A chucking device comprising a rotatable coupling unit formed for interconnection with one end of an arbor, the other end of the arbor having a groove therein, a chuck unit having a series of circularly disposed ball members to form interconnection with the groove of the arbor, means to hold the ball members in the groove to hold the arbor against displacement, and means associated with the chuck unit to apply a pulling force longitudinally of the arbor to hold the arbor against deflection.

12. A chucking device comprising a rotatable coupling unit formed for interconnection with one end of an arbor, the other end of the arbor having a groove therein, a chuck unit having a series of circularly disposed ball members to form interconnection with the groove of the arbor, means to hold the ball members in the groove to hold the arbor against displacement, means to rotate the units with the arbor to cause a material to wind under tension on the arbor, and means associated with the chuck unit to apply a pulling force longitudinally of the arbor to hold the arbor against deflection.

ALBERT L. PIZZI.
WILLIS R. QUACKENBUSH.